United States Patent [19]
Campbell et al.

[11] 4,214,398
[45] Jul. 29, 1980

[54] FISHHOOK

[76] Inventors: John W. Campbell; Lawrance W. Campbell, both of 1120 Federal Dr., Montgomery, Ala. 36107

[21] Appl. No.: 846,533

[22] Filed: Oct. 28, 1977

[51] Int. Cl.² .............................................. A01K 83/00
[52] U.S. Cl. .................................................. 43/43.16
[58] Field of Search ...................... 43/5, 43.16; 294/26

[56] References Cited
U.S. PATENT DOCUMENTS

| | | | |
|---|---|---|---|
| 1,706,881 | 3/1929 | Hampson | 43/43.16 |
| 2,101,491 | 12/1937 | Chilcott | 43/43.16 |
| 2,488,312 | 11/1949 | Millican | 294/26 |
| 3,023,536 | 3/1962 | Williams | 43/43.16 |

OTHER PUBLICATIONS

Tru Turn Tackle Company, Inc., Advertising Brochure.
*Alabama Journal*, "Fishhook with Offset on Shank Gets Results", Jul. 5, 1960.

*Primary Examiner*—Nicholas P. Godici
*Attorney, Agent, or Firm*—Berman, Aisenberg & Platt

[57] ABSTRACT

A fishhook having an offset in its shank which acts as a lever to turn the hook as pressure is applied to the line so as to engage the point in the flesh of the fish regardless of the angle at which pressure is applied to the line.

3 Claims, 4 Drawing Figures

FISHHOOK

BACKGROUND OF THE INVENTION

1. Field of the Invention

The invention relates to a fishhook, and more particularly to an improved fishhook including an offset portion in its shank which acts to swivel the entire fishhook up to 360° when pressure is applied to the line so as to automatically turn the hook and set the point in the fish in such a way as to exert a maximum hold, regardless of the angle at which pressure is applied to the line.

2. The Prior Art

In most conventional fishhooks the bend, point and shank are coplanar, so that when a fish attacks a baited hook and strikes a portion other than the point and an upward pull is exerted on the shank of the hook, there is a great danger of the hook's glancing away from the fish so that the catch is lost. Even if the fish swallows the point, the bend may lie flat between the jaws of the fish so that an upward pull only serves to slide the hook out of the mouth of the fish, again losing the catch.

By contrast the present invention provides an improved fishhook having an offset in its shank which acts as a lever, or eccentric, when any portion of the fishhook touches part of a fish to turn the fishhook in such a manner as to engage the point of the hook in the flesh of the fish. This is so whether the engagement is on the exterior of the body of the fish or within its mouth. Once the point of the hook engages the fish the offset causes the entire fishhook to swivel about its shank as much as 360° due to the upward pull on the shank transmitted through the offset to the point. This swiveling action and upward pull automatically set the fishhook in the flesh of the fish in such a way as to exert maximum hold. As a result the improved fishhook of the present invention operates with a great deal more efficiency than conventional fishhooks and the number of fish caught is at a maximum.

SUMMARY OF THE INVENTION

From the above it will be apparent that a major object of the present invention is to provide an improved fishhook having a point, bend and shank, the shank having an offset therein which operates as an eccentric or lever to swivel the entire fishhook through as much as 360° and set the point in the fish at its most efficient angle when an upward pull of the fishing line is exerted on the fishhook and the point or any other part of the fishhook strikes the fish.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will be best understood from the following description of a specific embodiment when read in connection with the accompanying drawings, wherein like reference characters indicate like parts throughout the several figures, and in which:

DESCRIPTION OF THE PREFERRED EMBODIMENT

Figure 2:
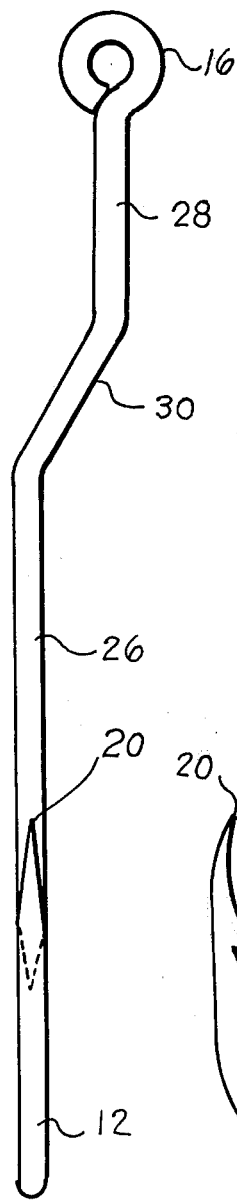
FIG. 2 is an elevational view of the fishhook of FIG. 1 turned 90° and looking from the point towards the shank.

Referring now more particularly to the drawings, the improved fishhook according to the invention is illustrated by general reference numeral 10 as comprising a bend 12, a shank 14 and an eye 16. The shank 14 includes a lower portion 26, first offset 30 and a second offset 28.

Figure 1:
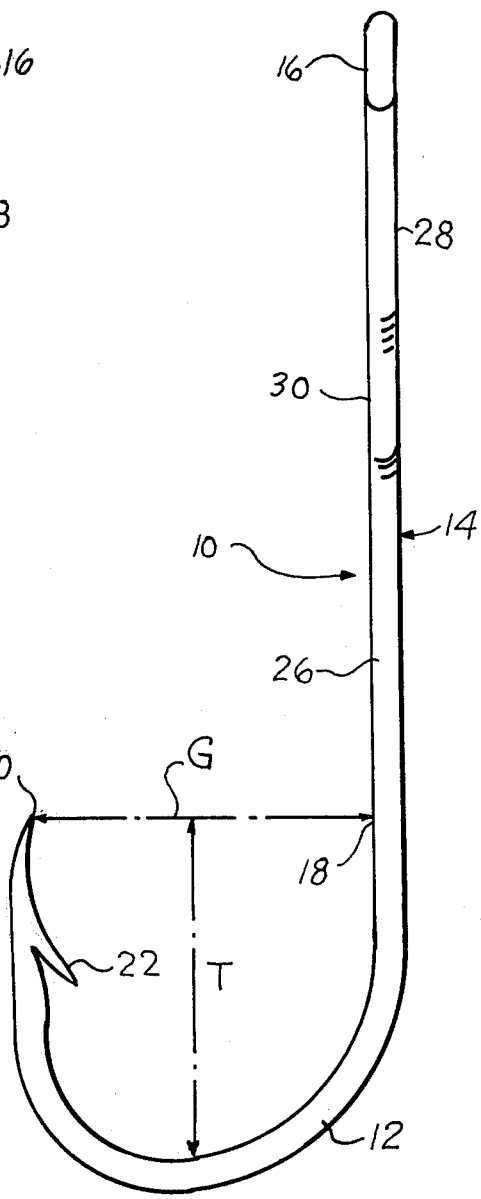
FIG. 1 is an enlarged side elevation of an improved fishhook according to the invention.

The bend 12 extends from 18, FIG. 1 in a wide curve to the upwardly directed point 20, there being an inwardly projecting barb 22 adjacent the point. The gap extends a distance G from point 20 to 18.

The lower shank portion 26 is a linear extension of bend 12, extending between 18 and 24. At 24 the lower shank portion 26 is bent laterally to form a first offset 30. Experimentation with hooks of different sizes has determined that by far the best results are obtained when the lower shank portion 26 has a length equal to the gap G. While some variation of the angle A of offset 30 is possible, the best results are obtained when this angle equals 30° and when the length of offset 30 equals one-half the length of gap G. The other end of offset 30 is integrally connected to second offset 28 which may be of any suitable length and is coplanar with lower shank portion 26 and first offset 30 and parallel to portion 26.

Upper shank portion 28 terminates in eye 16 for attachment of a fishing line. Any suitable attachment means may be used, as for example, a ball eye, an up-eye, a down-eye, or a needle eye. It should be noted that in FIG. 3 the angle of inclination A of the offset 30 is shown as being to the left of the plane of lower shank portion 26 and bend 12, but this angle could as well be inclined to the right of the said plane with equally satisfactory results.

MODE OF OPERATION

Figure 3:
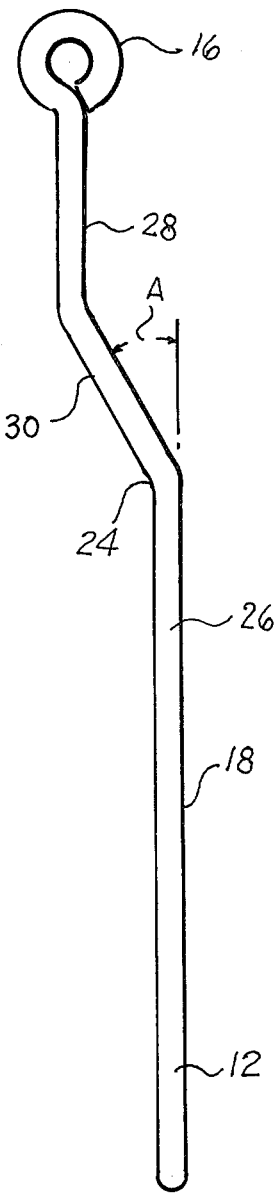
FIG. 3 is an elevational view of the fishhook of FIG. 1 turned 90° in the opposite direction and looking from the shank towards the point.
Figure 4:
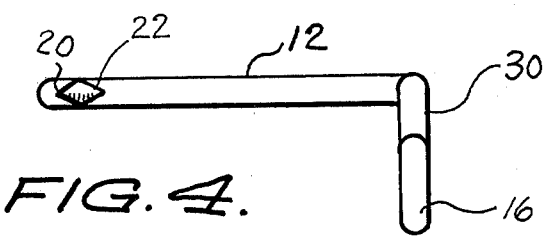
FIG. 4 is a plan view of the fishhook looking downwardly, from the eye at the top of the shank toward the bend and point at the bottom.

Because of the offset 30, the center of weight of the fishhook is displaced slightly to the left of the plane of lower shank 26 and bend 12 as viewed in FIG. 3; that is, the center of weight is eccentrically located. Consequently when the fishhook, whether baited or unbaited, strikes any portion of the body of a fish, the first offset 30 acts as a lever or eccentric to turn the point about second offset 28 toward the direction of the striking force to cause the point to embed itself in the fish as the hook is pulled upwardly. The offset 30 can cause the point to turn as much as 360° and then automatically set in the most advantageous position to get the best possible hold on the flesh of the fish.

Assuming now that the point 20 of the fishhook is the part which first engages the exterior of the fish or the interior of the mouth of the fish, and an upward pull is applied, the force of the pull is directed through offset 30, lower shank portion 26 to bend 12 and first offset 30 again acts as an eccentric or lever to swivel the point 20 about second offset 28 so as to engage a maximum portion of the fish within the throat T of the fishhook.

Should the direction of pull on the line change, the point 20 of the hook automatically follows the new angle of pressure, insuring that the fish pull directly against the point at all times.

In contrast conventional fishhooks, having a bend and a shank lying in the same place, frequently will contact a portion of the body of the fish or the outer portion of the length of a fish and merely glance off. Even if the contact is with the point, frequently the point merely pulls through a small thickness of soft flesh to release the fish from the hook.

Although a certain specific embodiment of the invention has been shown and described, it is obvious that many modifications thereof are possible. The invention, therefore is not intended to be restricted to the exact showing of the drawings and description thereof but it considered to include reasonable and obvious equivalents.

What is claimed is:

1. A fishhook comprising, a bend defining a gap between an upwardly directed point at one end and an upwardly directed other end, a lower shank portion whose length equals the gap width, connected to said other end of the bend and lying in the same plane, an upwardly directed first offset connected to the upper end of the lower shank portion and laterally inclined with respect to the plane of the bend and lower shank portion, the lower shank portion being that portion of the shank commencing at a point diametrically opposite the tip of said upwardly directed point and terminating at the commencement of said first offset, the length of said first offset being equal to substantially half the gap width and a second offset extending from the upper end of the first offset and terminating at its upper end in means for attachment of a fishing line; whereby when any portion of the fishhook strikes a fish said first offset acts as an eccentric or lever to swivel the fishhook so as to turn the point toward the direction of the striking force on the hook, thereby automatically engaging the point and setting the fishhook to exert maximum hold in the flesh of a fish upon exertion of pull on the fishing line.

2. A fishhook according to claim 1, wherein said offset is inclined at an angle of 30° to the plane of said lower shank portion and bend.

3. A fishhook according to claim 1, wherein said second offset is straight and lies in a plane parallel to said plane of the lower shank portion and bend.

* * * * *